US008620339B2

(12) United States Patent
McCormick (10) Patent No.: US 8,620,339 B2
(45) Date of Patent: Dec. 31, 2013

(54) SYSTEM AND METHOD FOR PROVIDING QUALITY OF SERVICE MAPPING

(75) Inventor: Josh C. McCormick, Tulsa, OK (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1082 days.

(21) Appl. No.: 12/058,915

(22) Filed: Mar. 31, 2008

(65) Prior Publication Data

US 2009/0245118 A1 Oct. 1, 2009

(51) Int. Cl.
*H04W 72/00* (2009.01)

(52) U.S. Cl.
USPC .............. 455/452.2; 455/456.1; 455/446; 455/63.1; 370/329; 370/332

(58) Field of Classification Search
USPC .................................. 455/423–425
See application file for complete search history.

(56) References Cited

U.S. PATENT DOCUMENTS

| | | | |
|---|---|---|---|
| 6,038,444 A * | 3/2000 | Schipper et al. ............. | 455/421 |
| 6,799,047 B1 * | 9/2004 | Bahl et al. .................. | 455/456.1 |
| 7,158,790 B1 * | 1/2007 | Elliott ......................... | 455/446 |
| 2002/0042269 A1 * | 4/2002 | Cotanis ........................ | 455/423 |
| 2002/0049064 A1 * | 4/2002 | Banno ......................... | 455/456 |
| 2002/0155816 A1 * | 10/2002 | Fodor et al. ................. | 455/67.1 |
| 2003/0125043 A1 * | 7/2003 | Silvester ...................... | 455/456 |
| 2004/0203913 A1 * | 10/2004 | Ogino et al. ............... | 455/456.1 |
| 2006/0089153 A1 * | 4/2006 | Sheynblat .................. | 455/456.1 |
| 2007/0037570 A1 * | 2/2007 | Donovan et al. ............. | 455/423 |
| 2007/0111748 A1 * | 5/2007 | Risbood .................... | 455/550.1 |
| 2007/0178911 A1 * | 8/2007 | Baumeister et al. ....... | 455/456.1 |
| 2008/0117869 A1 * | 5/2008 | Freen et al. .................. | 370/329 |
| 2008/0268830 A1 * | 10/2008 | Sharma et al. ............... | 455/421 |

* cited by examiner

*Primary Examiner* — Rafael Pérez-Gutiérrez
*Assistant Examiner* — Keith Fang (57) ABSTRACT

A system and method for providing quality of service mapping including a first receiver to receive location data of a mobile device, a transmitter to transmit the location data to one or more servers of a service provider, and a second receiver to receive signal quality information based on the location data. The signal quality map be used to provide at least a signal quality map, a coverage area map, an availability map, and turn-by-turn directions for optimized signal quality or availability, based on the signal quality information. The signal quality map be also be used to improve overall service in the event of signal loss or signal degradation.

21 Claims, 5 Drawing Sheets

SYSTEM AND METHOD FOR PROVIDING QUALITY OF SERVICE MAPPING

BACKGROUND INFORMATION

Mobile devices, such as, electronic hand-held devices are becoming extremely popular. These generally include mobile phones, notebook computers, personal digital assistants (PDAs), smart phones, music players, portable gaming devices, digital cameras, and global navigation system (GPS) devices. With recent advances in technology, features of these separate devices are being integrated into a single device. For example, a mobile phone may include the capability to capture digital images, play music, play video games, and access data from the Internet. However, current systems lack an integrated device that comprehensively and effectively provides quality of service mapping (e.g., a map of signal strength at various localities) and other global navigation system (GPS) navigation-based features.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Reference will now be made in detail to exemplary embodiments, examples of which are illustrated in the accompanying drawings. It should be appreciated that the same reference numbers are used throughout the drawings to refer to the same or like parts. It should be appreciated that the following detailed description are exemplary and explanatory only and are not restrictive.

Exemplary embodiments may provide a system and method for providing quality of service mapping and other integrated GPS-related features and functionalities. That is, exemplary embodiments may, among other things, expand telecommunications and the market for integrated mobile devices.

System Architecture & Components

Figure 1:
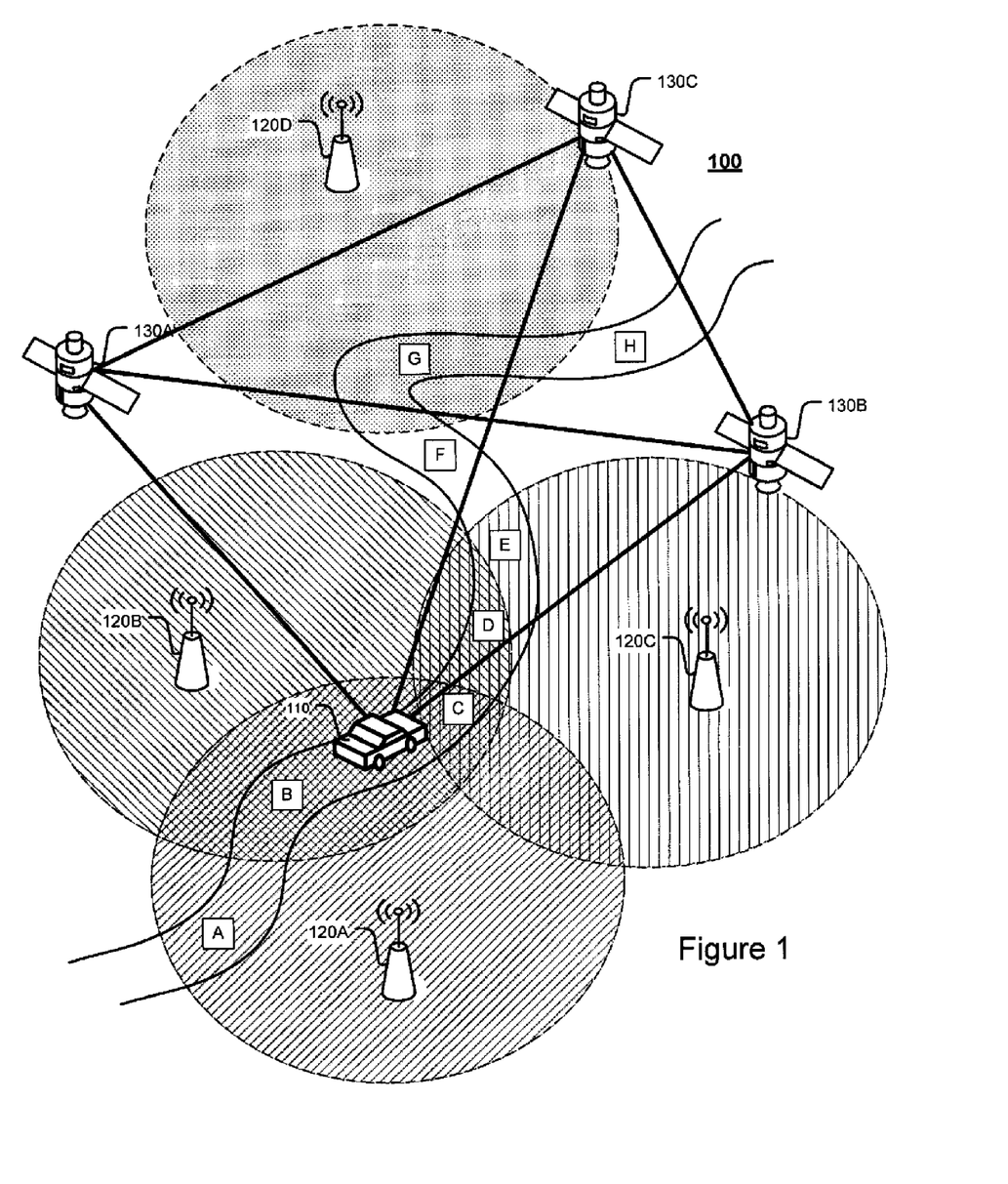
FIG. 1 depicts a block diagram of a system architecture, according to an exemplary embodiment.

FIG. 1 depicts a block diagram of a system architecture 100, according to an exemplary embodiment. It should be appreciated that system 100 is a simplified view of a network and may include additional elements that are not depicted. As illustrated, the system 100 may include an exemplary wireless network of a service provider and a global positioning system (GPS) overlayed with the network. In this example, a mobile device 110 may be communicatively coupled to one or more Base Transceiving Stations (BTS) 120A, 120B, 120C, 120D. Each BTS 120A, 120B, 120C, 120D may be monitored and controlled by one or more Base Station Controllers (BSC) (not shown), which in turn may be connected to various networks and/or servers of a service provider, for example, via a Mobile Communications Center (MCC) (not shown). The system 100 may also include GPS satellites 130A, 130B, 130C which may be communicatively coupled to the mobile device 110.

The mobile device 110 may include various communications systems and/or devices. For example, such systems and/or devices may include desktop computers, laptops/notebooks, Personal Digital Assistants (PDA), smart phones, wireline phones, cellular phones, mobile phones, satellite phones, MP3 players, video players, personal media players, personal video recorders (PVR), watches, gaming consoles/devices, navigation devices, televisions, printers, and/or other devices capable of receiving and/or transmitting signals. It should be appreciated that a mobile device 110 may be used independently or may be used as an integrated component in another device and/or system. For example, as depicted in FIG. 1, the mobile device 110 may be integrated with an automobile or automobile components.

Base Transceiving Stations (BTS) 120A, 120B, 120C, 120D may include radio transceivers that define a cell and may coordinate radio-link protocols with a mobile device 110. The BTS 120A, 120B, 120C, 120D may also provide a networking component of a mobile communications system from which signals are sent and received. BTS 120A, 120B, 120C, 120D may be controlled and monitored by one or more Base Station Controllers (BSC) to provide communication over a network. The network may be the Internet or one or more other networks utilized for connecting various network providers and/or clients.

The one or more BSCs may be controlled via a Mobile Communication Center (MCC) of a service provider. The Mobile Communication Center (MCC) may include a switching node that assumes the technical functions of a network switching node, for example, path searching, signal path switching, and/or processing of supplementary services. Additionally, if there is a requirement for a connection to a subscriber in a network, the request may be forwarded by the MCC to the network over a switching path. Although only one MCC is described in this example, it should be appreciated that additional MCCs may be used by a service provider.

In order for a system 100 to provide various services to its subscribers, the MCC may access a variety of databases, which may be internal and/or external to the MCC. These databases may store information that identifies subscribers using its service and for which service features are subscribed. For example, the databases may store information such as a subscriber's customer name, identification number, services, and/or other identifiers. The databases may also store information relating to where the subscriber is physically located and/or whether his or her mobile device 110 is switched on.

It should be appreciated that the contents of these databases associated with the Mobile Communication Center (MCC) may be combined into fewer or greater numbers of databases and may be stored on one or more data storage systems and in more than one format. The data storage systems may be local, remote, or a combination thereof to clients systems, servers, and/or other network components. Information stored in the databases may be useful in providing additional customizations for providing quality of service mapping and/or other related services.

Communication between the various service providers and/or subscribers may be achieved via transmission of electric, electromagnetic, or wireless signals and/or packets that carry digital data streams using a standard telecommunications protocol and/or a standard networking protocol. These may include Session Initiation Protocol (SIP), Voice Over IP (VoIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols. Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, etc., or via protocols for a wired connection, such as an IEEE Ethernet 802.3.

Referring back to FIG. 1, the system 100 depicts an automobile having a mobile device 110, such as an integrated GPS phone or other similar device, traveling along a roadway (e.g., a street or highway). In this example, the automobile has passed BTS 120A and coverage area A and is within coverage area B. Coverage area B includes signals from BTS 120A and BTS 120B. As the mobile device 110 continues to move along the roadway, the mobile device 110 will pass to coverage area C, which is an overlap of BTS 120A, BTS 120B, and BTS 120C. It should be appreciated that the strength of communication from BTS 120A and BTS 120B may weaken as the mobile device approaches coverage area C. For example, coverage area D may provide communication from BTS 120B and BTS 120C, and coverage area E may provide communication from only BTS 120C. Coverage area F may represent an area without any signal from any BTS. As a result, the mobile device may not be able receive or make calls within this coverage area. However, as the mobile device reaches coverage area G, it may once again establish communication with another BTS, in particular BTS 101D. As the mobile device 110 progresses along the roadway, it may make one or more connections available to in each subsequent coverage area, e.g., coverage area H.

It should be appreciated that when the mobile device 110 functions as a phone, it basically provides a sophisticated two-way radio with one or more BTS. Because mobile phones tend to have low-power transmitters/receivers, they may only communicate with the nearest BTS. For example, as a mobile device 110 moves closer to one BTS and further from another BTS, the signal at the device may increase/decrease accordingly. Here, the BTS work together to transfer the signal from one BTS to another BTS.

Even without a GPS receiver, the mobile device 110 may be capable of providing information about its location. This information may include angle of approach from the BTS, how long it takes a signal to travel from the mobile device 110 to multiple BTS, and/or the strength of the signal when it reaches the one or more BTS. However, such location information may not always be reliable because of obstacles, such as trees, buildings, etc., which may interfere with signal travel to and from the mobile device 110 to the one or more BTS.

It should be appreciated that a mobile device 110 may be equipped with a GPS receiver. In this example, a GPS receiver may also rely on radio waves/signals similar to that of a mobile phone. But instead of using towers, such as BTS on the ground, communication may be made with satellites that are situated and/or orbit the earth.

In order to determine a location of a mobile device 110, the GPS receiver in the mobile device 110 may send/receive signals from at least 3 GPS satellites 130A, 130B, 130C. This may be referred to as "triangulation." Therefore, to determine a location of a mobile device 110, the GPS receiver may use triangulation to draw a sphere around each of the three GPS satellites (e.g., GPS satellites 130A, 130B, 130C). These spheres may intersect at two points—one in space and the other on the ground. The point on the ground may represent the relative location of the mobile device 110. Allowing consecutive signaling between the mobile device 110 and the GPS satellites 130A, 130B, 130C may generate a near real-time positioning of the mobile device 110.

A mobile device 110 may further include additional programming, such as Java-based software, so that additional features, such as turn-by-turn directions or information about nearby businesses and attractions, may be provided at the GPS receiver within the mobile device 110. In one embodiment, a service provider may support transmission of maps and/or GPS data. Such maps may be provided in a service plan offered by the service provider and may be imported from third party sources. Other various features and/or embodiments may also be provided.

It is within this framework that a service provider may provide quality of service mapping at one or more mobile devices. A quality of service map may be a signal quality map provided to user or subscribers at a mobile device 110 to assist a user or subscriber to ascertain the level of signal quality in a particular area. In one embodiment, signal quality data may be combined with location data to produce a signal quality map to be used at the mobile device 110. It should be appreciated that in addition to location data, signal quality data may also be combined with other data, such as the model of the mobile device, roaming status, direction of travel, speed of travel, etc.

A mobile device 110 with internal knowledge of signal quality and availability issues (e.g., whether displayed to the user of the mobile device or not) may provide a superior level of service when compared to devices that do not have this feature.

For example, in one embodiment, a data service may be streaming live audio and video to a mobile device to assist a user. If it is informed that its signal quality may degrade, the software at the mobile device or at the servers of the service provider may take action to avoid interruption. One such action may be to increase redundancy of the data stream and/or decreasing the bandwidth.

In another embodiment, a data service may stream recorded audio and video to its user. If the mobile device or the service provider is informed that its signal quality may degrade based on the location of the mobile device, redundancy of the data stream may be increased and/or the bandwidth requirements may be decreased. Additionally, more data than would regularly be required may be buffered to allow the mobile device may continue playing the recorded audio and video even through an interruption.

If the software is informed that the signal will be lost due to the location of the mobile device, further decisions may be made. For example, a mobile device may be given an estimated start time and/or duration of loss of signal. In another embodiment, the mobile device may receive this information from another source, e.g., the service provider. With this information, the mobile device may attempt to buffer more data before the signal is lost or, depending on the amount of warning, speed of the mobile device, and/or expected duration of the outage. For example, the amount of buffered data may differ based on the current speed that the mobile device is moving. If the mobile device is moving slowly, e.g., the mobile device is being carried by a person walking, the buffered data may buffer more information than if the mobile device is moving quickly, e.g., the mobile device is in a moving vehicle. The amount of buffered data may be based on an estimation of time before the mobile device can re-establish communication. For example, the estimation may be based on the speed of the mobile device is moving, the direction of the movement, and/or predicted location for re-establishing communication.

The buffered data can include commercial data associated with the location of the mobile device. For example, mobile device, such as a navigation system, may display not only map information, but commercial data. The commercial data can include, but is not limited to, locations of gas stations, restaurants, hotels, attractions, etc. The commercial data may also include prices and/or specials associated with the different locations. For example, the navigation system may display an upcoming gas station along with gas prices.

If the software is informed that the signal will be lost due to the location of the mobile device, the software may generate an estimation of time for the lost signal time (or time for re-establishing communication). For example, using the speed that the mobile device is traveling, direction of travel, and the expected location for re-establishing communication, the estimated time for re-establishing communication may be determined. The accuracy of the estimation may be improved by including the predicted path that the mobile device is traveling. For example, if a mobile device is in a vehicle entering a no signal area on a highway, an estimation of time for re-establishing communication may be based on the estimated speed of the vehicle, distance the vehicle will travel on the highway before re-establishing communication, and expected location for re-establishing communication (which can be determined from a map or information identifying the coverage area). The estimated time for re-establishing communication may be displayed on the mobile device.

It should be appreciated that while the service quality map may be used at the mobile device 110, a server at the MCC may also use a quality of service map. For example, the data required may be retrieved and/or compiled at the MCC or service provider, where the service quality map may ultimately be generated and/or distributed to one or more mobile devices. The service provider may also use the data internally or publish the quality of service map to the public in other ways.

It should also be appreciated that while the mobile device 110 is described as being equipped with a GPS receiver, the mobile device 110 may also be connected to an external GPS receiver as well. For example, a mobile device may connect to an external GPS receiver via Bluetooth, LAN, or other similar wired or wireless connection. Alternatively, a mobile device may also connect to a GPS receiver at a remote location via transmitting/receiving signals to the GPS receiver over a WAN or other similar network.

Figure 2:
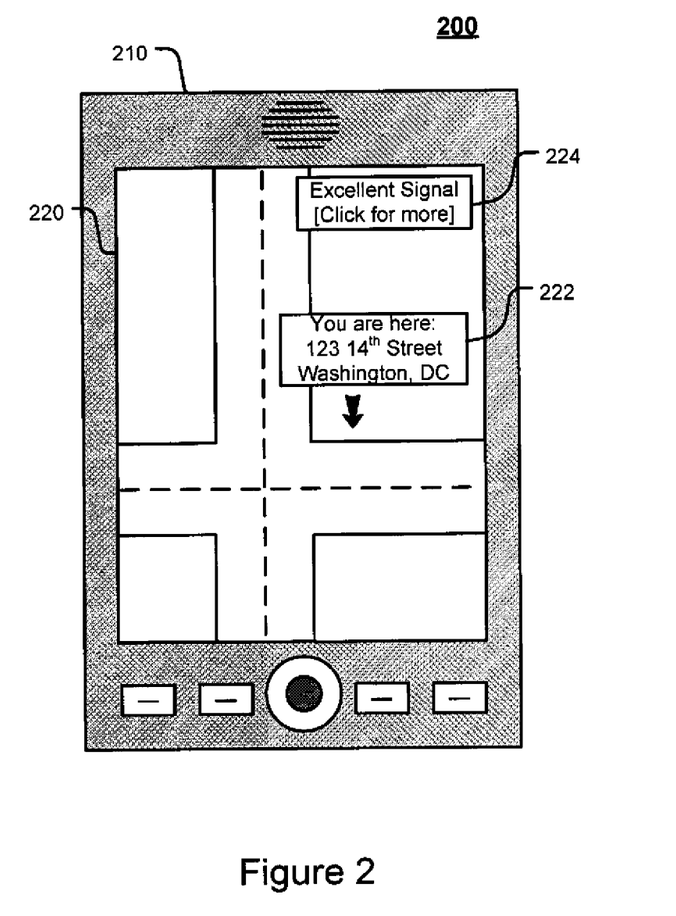
FIG. 2 depicts an illustrative screenshot of a quality of service map, according to an exemplary embodiment.

FIG. 2 depicts a screenshot of a quality of service map, according to an exemplary embodiment. In this example, a mobile device 210 may determine signal quality of service issues relative to the position of the mobile device 210. As discussed above, location data may be published or kept internal within the mobile device 110. Here, the mobile device 210 is publishing this information in the form of a map 220. The map 210 may provide the location 222 of the mobile device based on signals transmitted/received from its GPS receiver. In this example, mobile device 210 is located at "123 14$^{th}$ Street, Washington, D.C." Based on this location information, the mobile device may communicate with its service provider as to the quality of service it has at this particular location. In this example, the signal quality is "excellent" and may be presented in the map 224. It should be appreciated that this information may be presented in a variety of other ways, if presented at all. For example, these may include using various colors, bars, etc. It should also be appreciated that the signal quality window 224 may also provide a link to additional information regarding signal quality. For example, the link may provide additional quality of service information that may be useful to the subscriber at the mobile device 210, such as signal strength at other locations, etc.

While FIG. 2 depicts a particular embodiment of quality of service mapping, it should be appreciated that other various embodiments may also be provided. For example, a subset of quality of service may include availability and/or coverage of service. In addition to a quality of service map, a coverage map may also be provided. For instance, rather than providing a map of relative signal strength, a coverage map may have two degrees of service: "yes," there is service or "no," there is no service. In another embodiment, a coverage may have a reduced set of degrees of "coverage." For example, rather than two degrees of service, there may be four: none, low, medium, or high. In another embodiment, the map data may not be represented in discrete blocks. For example, a background quality of service level may be modified by one or more map elements with a defined center, strength shape modifier (e.g., circle, oval, spherical, etc.), and field decay rate as modifier expands from the center. The field decay rate may be used to reflect field decay from positives, e.g., a transmission tower, and negatives, e.g., an interference, such as a building. As a result, the quality of service data may be described in a continuous manner. For any point, of any size, in the area of service, the quality of service for that point/area may be determined, e.g., extrapolated.

For some mobile devices, it may be advantageous to provide a coverage map with lower resolution. For example, if a mobile device has a low level of accuracy of the actual position of the mobile device, then providing a coverage map with lower resolution may be more beneficial. In such an embodiment, the coverage map would provide quality of service levels for larger areas rather than discrete locations. As a result, bandwidth and/or computing power may be conserved.

Other various levels/degrees of mapping may also be provided. Conceptually, a coverage map may be operated similarly to a quality of service map in a lower resolution version. This may be particular advantageous because a coverage map may not necessarily be required to collect field data from various mobile devices, for example, although such information would be beneficial. It should be appreciated that a coverage map may be unlikely to have transition or time information.

According to another embodiment, data either containing the coverage or quality of service maps, or the map information for a specific position (and/or position+vector of movement), could be sent to the Mobile Data Device itself. Or, it could be sent to the data provider that they are currently communicating with (example: data is queried by the mobile service provider, instead of by the mobile data device).

It should be appreciated that a service provider is not required to create a map for use by its subscribers. For example, in one embodiment, map data could be provided or collected by a third party or published/sold publicly. In another embodiment, a map may be created by the service provider, but referenced by a third party to improve the quality for that third party's particular data service or mobile device.

It should be appreciated that various formats of a map may be provided. For example, in one embodiment, the map format may be provided as a Cartesian coordinate system (grid). In another example, the map may be expressed as polar or spherical coordinates. Other various coordinate formats may also be provided. Furthermore, the map format may not be tied to the earth as a reference. For example, a map may use other objects, such as a cell tower or other similar objects, as a point of reference. In addition, the map format may include more than a single map. For example, there may be individual maps for each cell tower. It should also be appreciated that maps may be provided in a variety of graphical resolutions.

In addition to the points of data (e.g., coverage/quality information) being assigned to each location on a map, points of data may also be assigned to transitions between locations on a map. For example, an underground tunnel may be split between positions A and B. Position A may generally have good coverage, and position B may generally have good coverage. But an AB transition (which is in this case is underground) may have its own points of data which describe it as a transition with bad coverage.

Moreover, a map may also add direction of travel according to another embodiment. For example, a transition of A→B could have different data than a transition of B→A. This may also be represented in other formats, such as a transition from A→B with a bearing of 180,0,0, or simply a transition out of A with a bearing of 180,0,0. A transition out of A with a bearing of "null" could be another representation of a stationary position.

Map data may also include speed, e.g., to further differentiate between movement and stationary objects, or potentially methods of travel over a location. For example, factors such as speed, position, and/or bearing may be used to tell the difference between a pedestrian, a car, a train, a plane, etc. Each could have its own signal characteristics that may be captured. Such map data may also provide an improved indication of a location that a positioning system may not be able to accurately capture. In addition, the faster the mobile device is moving, typically, the less sensitive the mobile device will be to quality of service changes. As a result, to save bandwidth, the quality of service may be less detailed since such information may not be as useful due to the speed that the mobile device is moving.

Time may also be added as a factor to mapping. For example, a map may involve different sets of data describing the locations (and/or transitions) at different times. In particular, times may vary by any unit, such as minutes, hours, etc. Time may also store different variables for different days of the week, day of the month, day of the year, etc. This time factor may be important for networks where the signal quality depends on the number of participants, with CDMA networks as an example. Also, certain times of the day (e.g., 5:00 to 7:00 PM) or months of the year (e.g., December during holidays) may use greater network capacity.

It should be appreciated that a map may take on different representations. As discussed above, these may include a populated coordinate or polar map, a representation of borders around regions, etc. For example, a border mapping would be one useful representation of signal in a coverage map.

Values for map positions may be expressed in absolute terms or relative terms, such as relative to the surrounding areas. It should be appreciated that other various representations of the data may also be provided.

It should appreciated that quality of service or coverage maps may also provide data for altitude. Altitude may provide another dimension characteristic. For example, this may be particularly advantageous for multi-level office buildings having different signal characteristics than ground data or subterranean locations generally having inferior signal characteristics than above ground. Altitude may also be used to define special modes, such as an "office building mode" for identifying a high rise building that would have mixes of signal ranges inside of it. This may also include signal quality inside of an elevator.

Figure 3:
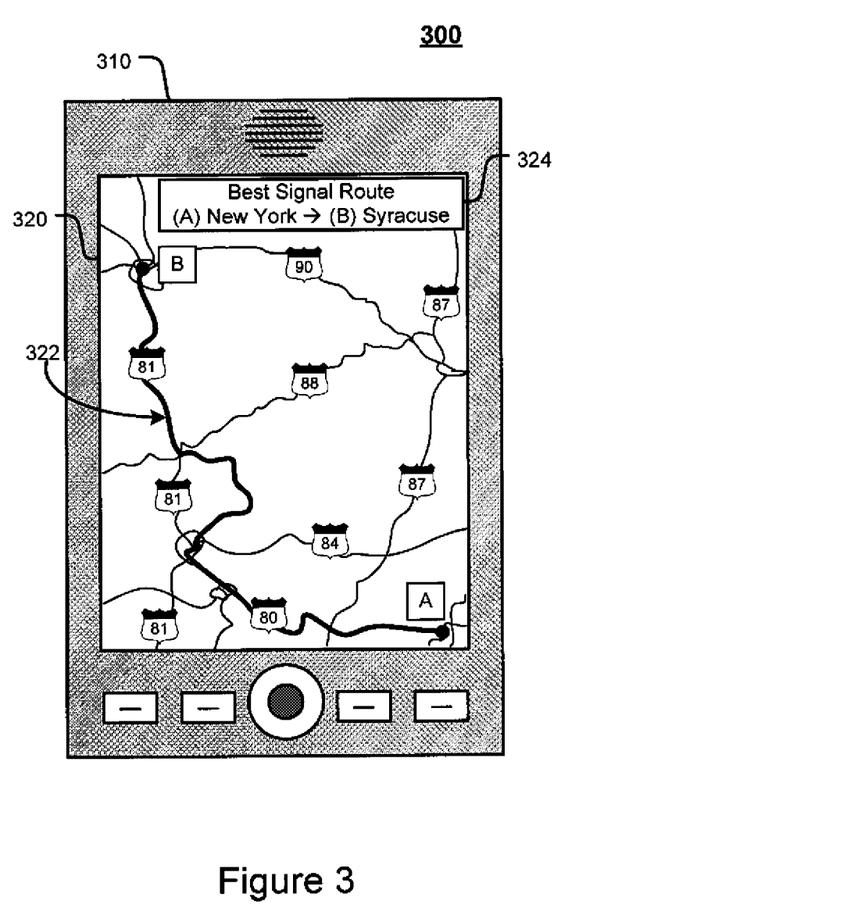
FIG. 3 depicts an illustrative screenshot of map directions for optimized service signal, according to an exemplary embodiment.

Another embodiment for quality of service mapping may include optimizing traveling directions based on signal strength/quality. For example, FIG. 3 depicts an illustrative screenshot 300 of map directions for optimized service signal, according to an exemplary embodiment. In this example, rather than a mobile device knowing when predicting when to download data, increasing buffering, etc., while a user is traveling, a mobile device may provide one or more routes of travel that would maximize quality of service between destinations. For instance, the mobile device 310 may include a map 320 that maps out directions from "New York" to "Syracuse" that is not based on the shortest distance or the fastest distance (although such data may also be provided). Rather, the mobile device 310 may map out a route that best optimizes signal quality throughout the trip as a "Best Signal Route" 324. It should be appreciated that in the map 320, the fastest and most direct way to travel to Syracuse from New York would probably be via Interstate 81. However, in the event one or more BTS are down or signal strength is low or null, the mobile device 310 may provide a route for the user of the mobile device 310 so that signal may not be lost or diminished during travel. It should be appreciated that such information may be highly important for business. It may also be important for a new driver who is not familiar with the area and wants to ensure signal capability during such a long trip. It may also be important for safety and other similar concerns. As discussed above, quality of service mapping may integrate various technologies (e.g., cellular/mobile data services, Internet access, and positioning technologies) to allow for whole new classes of mobile services By providing quality of service mapping and other related services, overall quality of a data service may be increased and improved. Furthermore, smaller pockets of service disruption may be compensated, which may also provide an increase in the quality of service. As a result, this may lead to added revenues for a carrier or service provider.

In addition, customers and subscribers may be better informed of the boundaries of their service, which allows a mobile device greater flexibility to cache data for when they will be off-network. For example, a subscriber who knows when service will and will not be available may optimize use of his or her mobile device, such as route selection in a navigational system, buffering before signal strength becomes low, etc.

It should be appreciated that such technology may be used to compare and/or publish the quality or coverage of one or more mobile data networks. In other words, compatibility may be provided over various service providers and/or mobile devices. It should also be appreciated that quality of service may not merely be directed to a subscriber, but may also include other potential parties. Other third parties may include map providers, advertisers, web or Internet hosts, etc. In essence, any party that may be engage in various forms of information distribution may benefit from quality of service mapping with their mobile customers.

Figure 4:
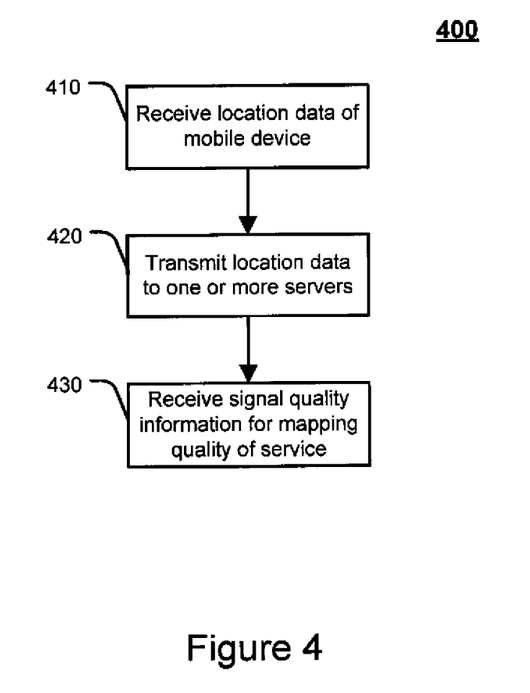
FIG. 4 depicts a flowchart of a method for providing quality of service mapping, according to an exemplary embodiment.

FIG. 4 depicts a flowchart of a method for providing quality of service mapping 400, according to an exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by the system 100 shown in FIG. 1 by way of example, and various elements of the system 100 are referenced in explaining the example method of FIG. 4. Each block shown in FIG. 4 represents one or more processes, methods, or subroutines carried out in the exemplary method 400. A computer readable media comprising code to perform the acts of the method 400 may also be provided. Referring to FIG. 4, the exemplary method 400 may begin at block 410.

At block 410, location data may be received. For example, a first receiver at a mobile device may receive location information from one or more GPS satellites. In one embodiment, the location data may be received from at least one of a positioning system, a service provider, and a mapping party. It should be appreciated that the location data, as discussed above, may be based on at least one of Cartesian coordinates, polar coordinates, or spherical coordinates.

At block 420, location data may be transmitted. For example, a transmitter at the mobile device may transmit the location data to one or more servers of a service provider to determine signal quality. At block 430, signal quality information may be received. For example, a second receiver at the mobile device may receive signal quality information from one or more servers of a service provider based on the location data.

It should be appreciated that an output may also be provided to output signal quality information at the mobile device by generating at least a signal quality map, a coverage area map, and an availability map, at the mobile device based on the signal quality information. In another embodiment, the output may output signal quality information at the mobile device by generating turn-by-turn directions for optimized signal quality or availability.

It should also be appreciated that signal quality information may not be necessarily be outputted at the mobile device. For example, signal quality information may be provided at the mobile device to provide improved service. In one embodiment, when the signal quality information indicates a degradation of signal quality, providing improved service may include increasing redundancy of a data stream and decreasing the bandwidth. In another embodiment, when the signal quality information indicates a loss of signal quality, providing improved service may include at least one of increasing data buffering and estimating duration of inactivity in the event.

It should also be appreciated that method 400 may store information relating to location and signal strength in one or more data storage systems for future retrieval. In addition, it should be appreciated that the stored information relating to location and signal strength may also be updated in real-time or near real-time. Moreover, the information relating to location and signal strength may be supplied by third parties as well. For example, information from third parties, such as commercial information, advertisements, electronic media, multimedia, maps, etc., may also be received from third parties and stored in the one or more data storage systems.

Figure 5:
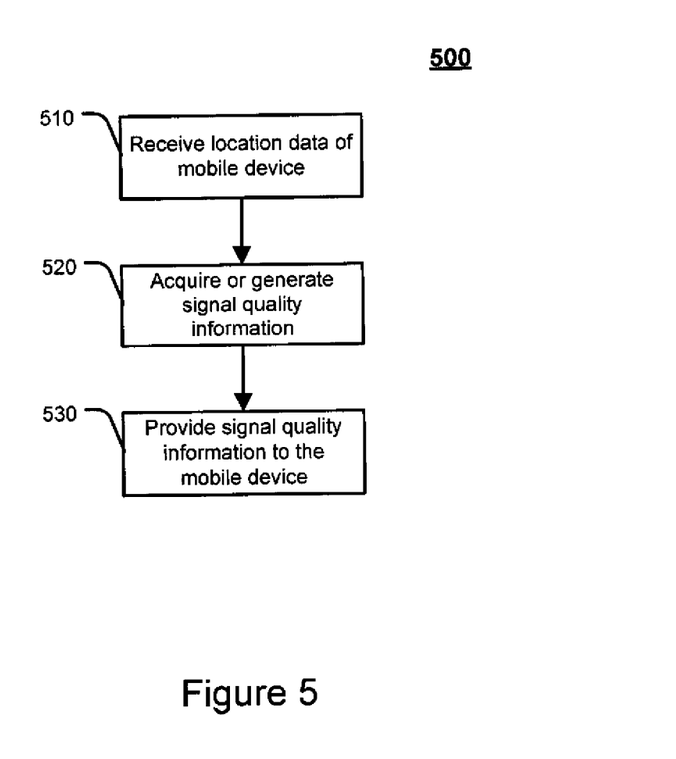
FIG. 5 depicts a flowchart of a method for providing quality of service mapping, according to another exemplary embodiment.

FIG. 5 depicts a flowchart of a method for providing latency signatures 500, according to an exemplary embodiment. The exemplary method 500 is provided by way of example, as there are a variety of ways to carry out methods disclosed herein. The method 500 shown in FIG. 5 may be executed or otherwise performed by one or a combination of various systems. The method 500 is described below as carried out by the system 100 shown in FIG. 1 by way of example, and various elements of the system 100 are referenced in explaining the example method of FIG. 5. Each block shown in FIG. 5 represents one or more processes, methods, or subroutines carried out in the exemplary method 500. A computer readable media comprising code to perform the acts of the method 500 may also be provided. Referring to FIG. 5, the exemplary method 500 may begin at block 510.

At block 510, location data may be received. For example, a receiver may receive location data of a mobile device. In one embodiment, the location data may be received from at least one of a server, a positioning system, a mapping party, or the mobile device.

At block 520, signal quality information may be acquired or generated. For example, a processor at a service provider (e.g., the MCC) may acquire signal quality information based on the location data from a server or may generate signal quality information based on the location data of the mobile device.

At block 530, the signal quality information may be outputted. For example, an output at a service provider (e.g., the MCC) may provide the signal quality information for use at the mobile device. In one embodiment, the signal quality information may be outputted as at least a signal quality map, a coverage area map, an availability map, and turn-by-turn directions for optimized signal quality or availability, based on the signal quality information.

It should also be appreciated that signal quality information may not be necessarily be outputted at the mobile device. For example, signal quality information may be provided at the mobile device to provide improved service. In one embodiment, when the signal quality information indicates a degradation of signal quality, providing improved service may include increasing redundancy of a data stream and decreasing the bandwidth. In another embodiment, when the signal quality information indicates a loss of signal quality, providing improved service may include at least one of increasing data buffering and estimating duration of inactivity in the event.

It should also be appreciated that method 500 may store one or more information relating to location and signal strength in one or more data storage systems for future retrieval. In addition, it should be appreciated that the one or more stored information relating to location and signal strength may also be updated in real-time or near real-time. Moreover, the information relating to location and signal strength may be supplied by third parties as well. For example, information from third parties, such as commercial information, advertisements, electronic media, multimedia, maps, etc., may also be received from third parties and stored in the one or more data storage systems. This information may also be provided to the mobile device based on the signal quality information for enhancing overall service.

In addition to the benefits described above, embodiments of the system and method for providing quality of service mapping not only provide an effective and improved technique for integrating cellular/mobile data, Internet access, and positioning technologies, but also may allow service providers (e.g., ISP) the ability to service a larger subscriber pool since existing protocols may remain intact because there may be minimal changes (if any) in hardware and/or network design. Moreover, advantages in business and marketing may also be apparent. Providing such a technique for providing quality of service mapping may maximize advertisement and marketing opportunities with third party vendors, etc., which may not otherwise be provided. For example, when using a mobile device equipped the features and functionalities described above, advertisements and other commercial information may also be presented to one or more subscribers.

While the features and functionalities of the providing quality of service mapping are primarily discussed with respect to the embodiments above, it should be appreciated that the features and functionalities of one embodiment may be similarly applied to other embodiments. For example, it should be appreciated that latency signatures may also be applied to TV network providers, multimedia providers (e.g., music file provider), etc. Furthermore, while the multimedia content and/or mapping content is described primarily with reference to mobile devices, client systems, servers, and networks, it should be appreciated that the functions and features of the embodiments of the system and method may apply similarly to a host of other multimedia and non-multimedia content as well, where applicable.

While the embodiments described above may be directed to the servers at a service provider and mobile devices to provide quality of service mapping, it should be appreciated that other components may include processing capabilities to perform the features described above as well. These may include other systems, components, and/or servers in the network provider, the client, mobile device, or other network systems. Additionally, it should be appreciated that one or more of these devices and/or components may be combined to provide the quality of service mapping features described above.

Furthermore, although the embodiments described above are directed toward GPS technology, it may be readily appreciated that the features and functionalities may apply to any positioning technology, such as Assisted Global Positioning System (AGPS), Galileo, GLONASS, and other similar technologies, may be used as well.

It should also be appreciated that while embodiments described above are directed toward cellular and mobile communications, other communication methods may also be provided to provide voice and data communications. These may include simple messaging service (SMS), BREW-based services, Cricket Clicks (which allow users to select and download new applications for a mobile device), etc. Other various technologies may also be implemented.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
receiving location data of a mobile device;
transmitting the location data from the mobile device to one or more servers of a service provider, wherein the location data comprises geographic, speed and bearing particulars of the mobile device;
receiving, at the mobile device, signal quality information based on the location data from the one or more servers;
generating signal quality optimization data at the mobile device, wherein signal quality optimization data includes at least one of: (i) turn-by-turn directions for optimized signal quality or availability or (ii) start time and duration of forecasted loss of signal, wherein generating the signal quality optimization data comprises generating and transmitting at least a signal quality map, a coverage area map, or an availability map, based on the signal quality information; and
providing improved service at the mobile device based on the signal quality optimization data, wherein providing improved service comprises increasing redundancy of a data stream or decreasing the bandwidth in the event the signal quality optimization data indicates a degradation of signal quality, and wherein providing improved service comprises increasing data buffering or estimating duration of inactivity in the event the signal quality optimization data indicates a loss of signal quality.

2. The method of claim 1, wherein the location data is received from at least one of a positioning system, a service provider, and a mapping party.

3. The method of claim 2, wherein the received location data is based on at least one of Cartesian coordinates, polar coordinates, and spherical coordinates.

4. A non-transitory computer readable media comprising code which when executed causes a computer to perform the acts of the method of claim 1.

5. The method of claim 1, wherein the signal quality optimization data further comprises a forecasted location of re-establishing communication after the forecasted loss of signal.

6. The method of claim 1, wherein the signal quality optimization data is based on the time, day of week, and date.

7. The method of claim 1, wherein the signal quality optimization data is based on a forecasted altitude.

8. The method of claim 1 further comprising:
receiving at least one of commercial information, advertisements, maps, electronic media, audio data, or video data based on the signal quality information,
wherein the commercial information and the advertisements include pricing information associated with a business in an area of forecasted loss of signal.

9. A system, comprising:
a first receiver, at a mobile device, to receive location data of the mobile device;
a transmitter, at the mobile device, to transmit the location data to one or more servers of a service provider, wherein the location data comprises geographic, speed and bearing particulars of the mobile device;
a second receiver, at the mobile device, to receive signal quality information based on the location data;
an output, at the mobile device, to provide signal quality optimization data at the mobile device, wherein signal quality optimization data includes at least one of: (i) turn-by-turn directions for optimized signal quality or availability or (ii) start time and duration of forecasted loss of signal, wherein providing the signal quality optimization data comprises providing at least a signal quality map, a coverage area map, or an availability map, based on the signal quality information; and
a processor, at the mobile device, to provide improved service at the mobile device based on the signal quality optimization data, wherein providing improved service comprises increasing redundancy of a data stream or decreasing the bandwidth in the event the signal quality optimization data indicates a degradation of signal quality, and wherein providing improved service comprises increasing data buffering or estimating duration of inactivity in the event the signal quality optimization data indicates a loss of signal quality.

10. The system of claim 9, wherein the mobile device is at least one of a desktop computer, a laptop or notebook computer, a Personal Digital Assistants (PDA), a smart phone, a wireline phone, a cellular phone, a mobile phone, a satellite phone, an multimedia device, a video player, a personal video recorders (PVR), a watch or clock, a gaming console or device, a navigation device, a television, a printer, and a medical emergency device.

11. The system of claim 9, wherein the signal quality information further comprises at least one of: a forecasted location of re-establishing communication after the forecasted loss of signal, signal quality information based on the time, day of week, and date, or signal quality information based on a forecasted altitude.

12. The system of claim 9, further comprising:
a third receiver, at a mobile device, to receive at least one of commercial information, advertisements, maps, electronic media, audio data, or video data based on the signal quality information,
wherein the commercial information and the advertisements include pricing information associated with a business in an area of forecasted loss of signal.

13. A method, comprising:
receiving location data of a mobile device, wherein the location data comprises geographic, speed and bearing particulars of the mobile device;
acquiring or generating signal quality information based on the location data;
providing the signal quality information for use at the mobile device;
generating signal quality optimization data for use at the mobile device, wherein signal quality optimization data includes at least one of: (i) turn-by-turn directions for optimized signal quality or availability or (ii) start time and duration of forecasted loss of signal, wherein providing the signal quality information comprises generating and transmitting at least a signal quality map, a coverage area map, or an availability map, based on the signal quality information; and
providing improved service at the mobile device based on the signal quality information, wherein providing improved service comprises increasing redundancy of a data stream or decreasing the bandwidth in the event the signal quality information indicates a degradation of signal quality, and wherein providing improved service comprises increasing data buffering or estimating duration of inactivity in the event the signal quality information indicates a loss of signal quality.

14. The method of claim 13, further comprising:
providing at least one of commercial information, advertisements, maps, electronic media, audio data, or video data based on the signal quality information.

15. The method of claim 14, wherein the commercial information and advertisements include pricing information associated with a business in an area of forecasted loss of signal.

16. The method of claim 13, wherein the location data is received from at least one of a positioning system, a service provider, a mapping party, or the mobile device.

17. A non-transitory computer readable media comprising code which when executed causes a computer to perform the acts of the method of claim 13.

18. The method of claim 13, wherein the signal quality information further comprises at least one of: a forecasted location of re-establishing communication after the forecasted loss of signal, signal quality information based on the time, day of week, and date, or signal quality information based on a forecasted altitude.

19. A system, comprising:
a receiver configured to receive location data of a mobile device, wherein the location data comprises geographic, speed and bearing particulars of the mobile device;
a processor configured to:
acquire or generate signal quality information based on the location data,
generate signal quality optimization data for use at the mobile device, wherein signal quality optimization data includes at least one of: (i) turn-by-turn directions for optimized signal quality or availability or (ii) start time and duration of forecasted loss of signal, and
provide improved service at the mobile device based on the signal quality information, wherein the processor increases redundancy of a data stream or decreasing the bandwidth in the event the signal quality information indicates a degradation of signal quality, and wherein the processor increases data buffering or estimates duration of inactivity in the event the signal quality information indicates a loss of signal quality; and
a transmitter to provide the signal quality information and signal quality optimization data for use at the mobile device, wherein the transmitter further provides at least a signal quality map, a coverage area map, or an availability map, based on the signal quality information.

20. The system of claim 19, wherein the signal quality information further comprises at least one of: a forecasted location of re-establishing communication after the forecasted loss of signal, signal quality information based on the time, day of week, and date, or signal quality information based on a forecasted altitude.

21. The system of claim 19, wherein the transmitter further transmits at least one of commercial information, advertisements, maps, electronic media, audio data, or video data based on the signal quality information,
wherein the commercial information and the advertisements include pricing information associated with a business in an area of forecasted loss of signal.

* * * * *